United States Patent
Tomita (10) Patent No.: US 7,324,806 B2
(45) Date of Patent: Jan. 29, 2008

(54) SYSTEM AND METHOD FOR STORING AND MANAGING PERSONAL INFORMATION

(75) Inventor: Yusuke Tomita, Minato-ku (JP)

(73) Assignee: NEC Corporation, Tokyo (JP)

( * ) Notice: Subject to any disclaimer, the term of this patent is extended or adjusted under 35 U.S.C. 154(b) by 167 days.

(21) Appl. No.: 10/936,644

(22) Filed: Sep. 9, 2004

(65) Prior Publication Data

US 2005/0059380 A1 Mar. 17, 2005

(30) Foreign Application Priority Data

Sep. 17, 2003 (JP) ............................. 2003-324951

(51) Int. Cl.
*H04Q 7/20* (2006.01)
*H04B 7/00* (2006.01)

(52) U.S. Cl. ..................................... 455/411; 455/41.2

(58) Field of Classification Search ................ 455/411, 455/41, 567, 575.6, 566, 66, 517, 421, 74, 455/41.2, 41.3, 587, 68; 340/407.1, 525.46; 370/349, 338

See application file for complete search history.

(56) References Cited

U.S. PATENT DOCUMENTS

| | | | |
|---|---|---|---|
| 6,218,958 B1 * | 4/2001 | Eichstaedt et al. | 340/7.6 |
| 2001/0007817 A1 * | 7/2001 | Odagiri et al. | 455/421 |
| 2002/0107054 A1 * | 8/2002 | Fujisawa et al. | 455/573 |
| 2004/0116155 A1 * | 6/2004 | Aisenberg | 455/558 |
| 2004/0249797 A1 * | 12/2004 | Jarvinen et al. | 707/3 |
| 2005/0014534 A1 * | 1/2005 | Hareng et al. | 455/567 |

FOREIGN PATENT DOCUMENTS

| JP | 1-188062 A | 7/1989 |
|---|---|---|
| JP | 4-199952 A | 7/1992 |
| JP | 10-4450 A | 1/1998 |
| JP | H10-112746 A | 4/1998 |
| JP | 11-98576 A | 4/1999 |
| JP | 2001-069260 A | 3/2001 |
| JP | 2001-086220 A | 3/2001 |
| JP | 2001-223691 A | 8/2001 |
| JP | 2001-285448 A | 10/2001 |
| JP | 2002-51162 A | 2/2002 |
| JP | 2002-135372 A | 5/2002 |
| JP | 2002-171361 A | 6/2002 |
| JP | 2002-232961 A | 8/2002 |
| JP | 2002-281149 A | 9/2002 |
| JP | 2003-046634 A | 2/2003 |
| JP | 2003-109056 A | 4/2003 |
| JP | 2003-162473 A | 6/2003 |
| JP | 2003-198678 A | 7/2003 |
| JP | 2003-244294 A | 8/2003 |
| JP | 2005-300651 A | 10/2005 |

* cited by examiner

*Primary Examiner*—Naghmeh Mehrpour
(74) *Attorney, Agent, or Firm*—Sughrue Mion, Pllc.

(57) ABSTRACT

A system for storing and managing personal information comprising at least one mobile communication terminal, and a wristwatch capable of making mutual communication with the mobile communication terminal through short-range wireless communication. The wristwatch is provided with: a memory section that stores in advance user's personal information and also registered authentication information for deciding validity of the mobile communication terminal; and a control section that permits the mobile communication terminal to access the personal information stored in the memory section only when the information for authentication received from the mobile communication terminal matches said registered authentication information stored in the memory section.

36 Claims, 2 Drawing Sheets

SYSTEM AND METHOD FOR STORING AND MANAGING PERSONAL INFORMATION

BACKGROUND OF THE INVENTION

1. Field of the Invention

The present invention relates to a system, a method and a program, which are utilized in mobile communication terminals such as mobile phone terminals, personal digital assistants (PDA) or the like, for storing and managing the user's personal information.

2. Description of the Related Art

Conventionally, a mobile phone terminal has a telephone book (or referred to as an address book) called a memory dial that stores personal information, and the data stored in the telephone book can be used to easily perform an operation for sending electronic mail (e-mail) or for making a call. The data stored in the telephone book, however, cannot commonly be transferred to other mobile phone terminals except for a part of the data such as telephone numbers. For this reason, for example, when another mobile phone terminal has to be used as an alternative device to deliver the mobile phone terminal of the user's own for repair, it has been impossible to transfer the data of such mail addresses, stored in the telephone book of the mobile phone terminal, to the alternative device and to use the transferred data in the alternative device.

When a mobile phone terminal is replaced with a terminal of another communication carrier, the data is rewritten in the telephone book in the renewed mobile phone terminal, or alternatively the data, which have been stored in the original telephone book, are copied to a PC (a personal computer) and then the copied data are moved to a telephone book of the renewed mobile phone terminal. This task, however, takes a lot of trouble.

In this connection, mobile phone terminals have been proposed which are configured such that all the personal information stored in a telephone book can also be used for another mobile phone terminal. For example, JP 2001-86220 (hereinafter, referred to as Patent Document 1) describes a mobile phone device provided with a removable personal-information storing means for storing personal information. In this mobile phone device, the telephone book's personal information is stored in the personal-information storing means that is installed in the mobile phone device. The personal information of a telephone book can be used in any mobile phone device by installing the personal-information storing means in the desired mobile phone device.

In addition to the above described Patent Document 1, JP2003-46634 (hereinafter, referred to as Patent Document 2) describes a mobile phone terminal provided with a SIM (Subscriber Identity Module) card. In the mobile phone terminal of this type, telephone-book data stored in a SIM card can be used as well in another mobile phone terminal.

Explanation next regards problems of conventional mobile phone terminals.

As described above, conventional mobile phone terminals have been inconvenient, because it has been impossible to use telephone-book data of a mobile phone terminal, as is, in an alternative device or a new mobile phone terminal. In addition, in copying telephone-book data to a PC or the like, it has been necessary to use a medium such as a data-link cable, memory card or the like, which was trouble some to set up. In addition, in conventional mobile phone terminals, there are other problems as described below.

In cases where a mobile phone terminal is lost or left behind somewhere, it is feared that personal information stored in the mobile phone may be illegally used by another person.

Furthermore, a memory storage capacity in a mobile phone terminal is predetermined for each device model, and a user who wishes to store many items of information in a telephone book has had to purchase high storage-capacity mobile phone terminals which are high priced. In addition, in cases where the user wishes to save information in excess of the maximum storage capacity of the mobile phone terminal, he or she has had to purchase an external memory card. Furthermore, a mobile phone terminal commonly has a storage capacity memory designed to store a predetermined number of items of the telephone-book data that are to be saved. Thus, a case may happen that this storage capacity provides superfluous memory for a user who handles only a small amount of the telephone-book information. Above described problems impose an excessive cost burden on the user.

While the mobile phone terminals described in Patent Documents 1 and 2 allow the telephone-book data to be utilized in other mobile phone terminals as well, these mobile phone terminals require memories for downloading telephone-book data into other mobile phone terminals, and this entails cost burdens for the user as described above. In addition, neither of these mobile phone terminals are capable of effecting operations such as transmitting e-mail via a PC or the like, based on the telephone-book data installed in the mobile phone terminal, while a telephone call is in progress using that terminal.

SUMMARY OF THE INVENTION

It is an object of the present invention to solve the above-described problems and provide a system and a method for storing and managing personal information capable of facilitating the utilization of the personal information such as telephone-book data in another mobile phone terminal or a PC and reducing the cost burden on the user.

It is another object of the present invention to provide a portable external memory system for storing and managing personal information.

It is a further object of the present invention to provide a program for implementing such a method of storing and managing personal information.

The principal feature of the present invention is a system having at least one mobile communication terminal carried by a user, and a portable external memory system carried by the user capable of making mutual communication with said mobile communication terminal through short-range wireless communication, wherein said portable external memory system stores in advance the user's personal information and also stores the registered authentication information for deciding validity of the mobile communication terminal in a first memory section; the mobile communication terminal transmits the information for authentication entered by the user for accessing the personal information to the portable external memory system; and the portable external memory system permits said mobile communication terminal to access user's personal information stored in the first memory section only when the information for authentication received from said mobile communication terminal coincides with said registered authentication information stored in said first memory section.

In the above-described construction, personal information such as telephone-book data is not stored in a mobile phone terminal, which is a mobile communication terminal, but is stored in the portable external memory system. Thus, it is possible to reduce the storage capacity of the mobile phone terminal by the amount of memory that is required for storing the personal information. For this reason, it is feasible for the user to buy a mobile phone terminal that has a small storage capacity regardless of whether the user needs a large or small amount of registered information in a telephone book.

In addition, since the mobile phone terminal stores no personal information, the user can protect the personal information from being used for illegitimate purposes even if the user has lost the mobile phone terminal or left it behind.

The user, when he or she has no mobile phone terminal at hand, can make a call request to access the personal information stored in the portable external memory system, as is, through the use of a mobile phone terminal borrowed from an acquaintance.

Also, in cases where the mobile phone terminal is renewed due to contract renewal or renewal of the device model or the like, it is feasible to utilize the personal information stored in the portable external memory system, as is, through the use of the renewed mobile phone terminal.

In cases where a mobile phone fails and an alternative device is provided, the user can access the personal information stored in the portable external memory system using the alternative device.

Another feature of the present invention is in the construction that, when the user effects a predetermined input operation, the portable external memory system requests an input of the information for authentication necessary for access to the personal information, to the user, and reads out the personal information from the first memory section, only if the information for authentication entered by the user in response to the request coincides with the registered authentication information that is stored in the first memory section, and displays the read personal information. Since this construction allows displaying the personal information on the portable external memory system itself, the user can acquire necessary personal information using the portable external memory system even if the user has left his or her mobile phone terminal in his or her home.

A further feature of the present invention resides in the construction that, the mobile phone terminal stores the information for authentication that is entered by the user in the second memory section, and when an input operation for a telephone call request or transmission of an electronic mail is effected by the user, it transmits the information for authentication stored in the second memory section to the portable external memory system, following which the mobile phone terminal acquires from the portable external memory system the personal information necessary for the call request of the telephone or the transmission of the electronic mail and displays the acquired personal information. This construction allows automatic display of the personal information when a telephone call request and electronic mail transmission are performed.

Still a further feature of the present invention is in the construction that the mobile phone terminal, at the time of receiving a telephone call or the receipt of electronic mail, transmits the information for authentication, stored in the second memory section, to the portable external memory system; acquires the personal information on the caller of the arrived telephone call or the transmitter of the received electronic mail from the portable external memory system; and displays the acquired personal information. This construction allows the automatic display of personal information regarding the telephone caller and sender of electronic mail.

Still a further feature of the present invention is in the construction that the portable external memory system permits access to the personal information stored in said first memory section for at least two mobile communication terminals at once, each of which has the information for authentication that coincides with the contents of the registered authentication information. This construction allows the user to make a telephone call request with reference to personal information stored in the portable external memory system using a mobile communication terminal, while simultaneously making a mail communication using another mobile communication terminal (for example, a PC) with reference to personal information stored in the portable external memory system.

A further feature of the present invention is in the construction that a system device capable of effecting mutual communication with the portable external memory system through a short-range wireless communication, requests that the user input information for authentication necessary for access to the personal information when a predetermined input operation has been effected by the user and transmits the information for authentication, entered by the user in response to the request, to the portable external memory system; and the portable external memory system permits the system device to access the personal information stored in the first memory section only if the information for authentication received from the system device coincides with the registered authentication information stored in the first memory section. In this case, the system device can be configured to acquire, from the portable external memory system, destination information necessary for a telephone call request or transmission of electronic mail through a communication terminal connected to a predetermined communication network and to display the acquired information. This construction allows a telephone call request and electronic mail transmission at the system device with reference to the personal information stored in the portable external memory system.

The above and other objects, features and advantages of the present invention will become apparent from the following description with reference to the accompanying drawings, which illustrate examples of the present invention.

DESCRIPTION OF THE PREFERRED EMBODIMENT

Figure 1:
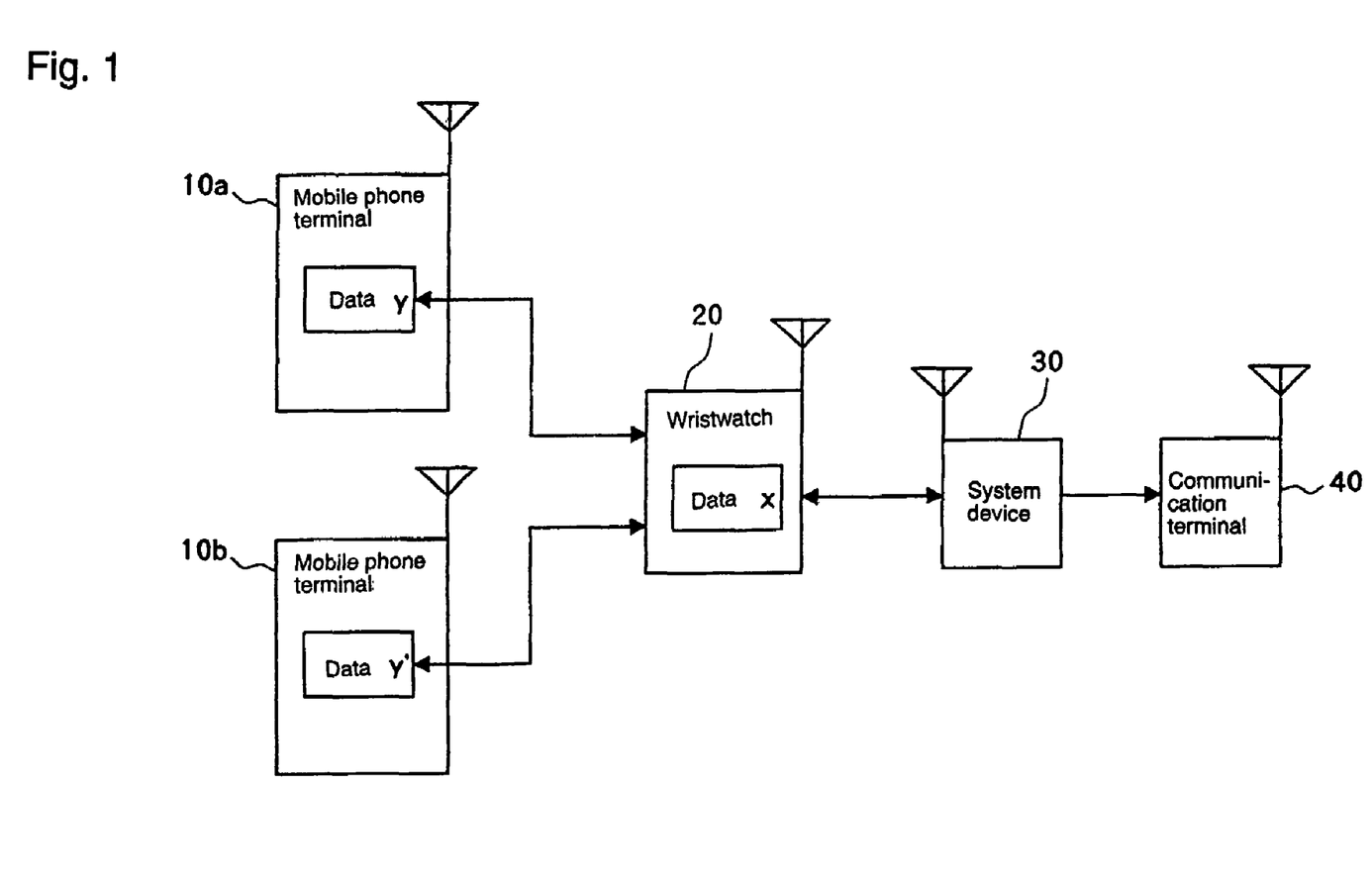
FIG. 1 is a schematic diagram of a system for storing and managing personal information of an embodiment according to the present invention.

FIG. 1 is a schematic diagram illustrating an embodiment of the system for storing and managing personal information (personal-information storage-management system) according to the present invention. This personal-information storage-management system comprises a plurality of mobile phone terminals 10a, 10b; wristwatch 20 capable of intercommunicating with the mobile phone terminals by means of short-range wireless communication (for example, "Bluetooth" (registered trademark) or the infrared communication); and system device 30 arranged to adjoin communication terminal 40 such as a public telephone or the like. While FIG. 1 shows only two mobile phone terminals, the number of mobile phone terminals is not specifically restrictive and can be one, three or more.

Mobile phone terminals 10a, 10b are portable telephones each represented by a browser phone and each have processing capability to effect the sending and receiving of a telephone call and the transmission and receipt of e-mail through utilization of personal information of the user. Wristwatch 20 is a portable external memory system for storing data x that is the user's personal information (the telephone-book data and the like). System device 30 is capable of intercommunicating with wristwatch 20 through a short-range wireless communication and receives data x from wristwatch 20. System device 30 and communication terminal 40 are connected through wired or wireless communication. Communication terminal 40 is capable of acquiring data x from system device 30 and effecting the sending and receiving of a telephone call and the transmission and receipt of e-mail.

In the personal-information storage-management system of the present embodiment, only data y, which are a part of the user's personal information (for example, a call register, the data required for redialing, and the transmission and receipt of e-mail and the like), are stored in mobile phone terminal 10a, and other items of personal information (including the telephone-book data) are stored as data x in wristwatch 20, which the user always takes with him or her. In mobile phone terminal 10a connected to wristwatch 20 through short-range wireless communication, necessary personal information can be obtained data x stored in wristwatch 20 without any restriction.

Furthermore, the user can transmit data x, which is stored in wristwatch 20, to system device 30 by connecting wristwatch 20 and system device 30 through short-range wireless communication, whereby the user can make a telephone call and send/receive of e-mail on communication terminal 40 through the use of data x received at system device 30. Specifically, the user can make a telephone call and communicate with e-mail using personal information (data x) in a public telephone.

In another mobile phone terminal 10b as well, only data y', which are a part of the personal information, are stored, and other data items are stored in wristwatch 20 as data x. In mobile phone terminal 10b connected to wristwatch 20 through short-range wireless communication, necessary personal information can be obtained data x stored in wristwatch 20 without any restriction. The acquisition of personal information made by mobile phone terminal 10b from wristwatch 20 and the acquisition of personal information made by mobile phone terminal 10a from wristwatch 20 can be made at the same time. The items acquired by each of mobile phone terminals 10a and 10b can be partially or totally the same.

Figure 2:
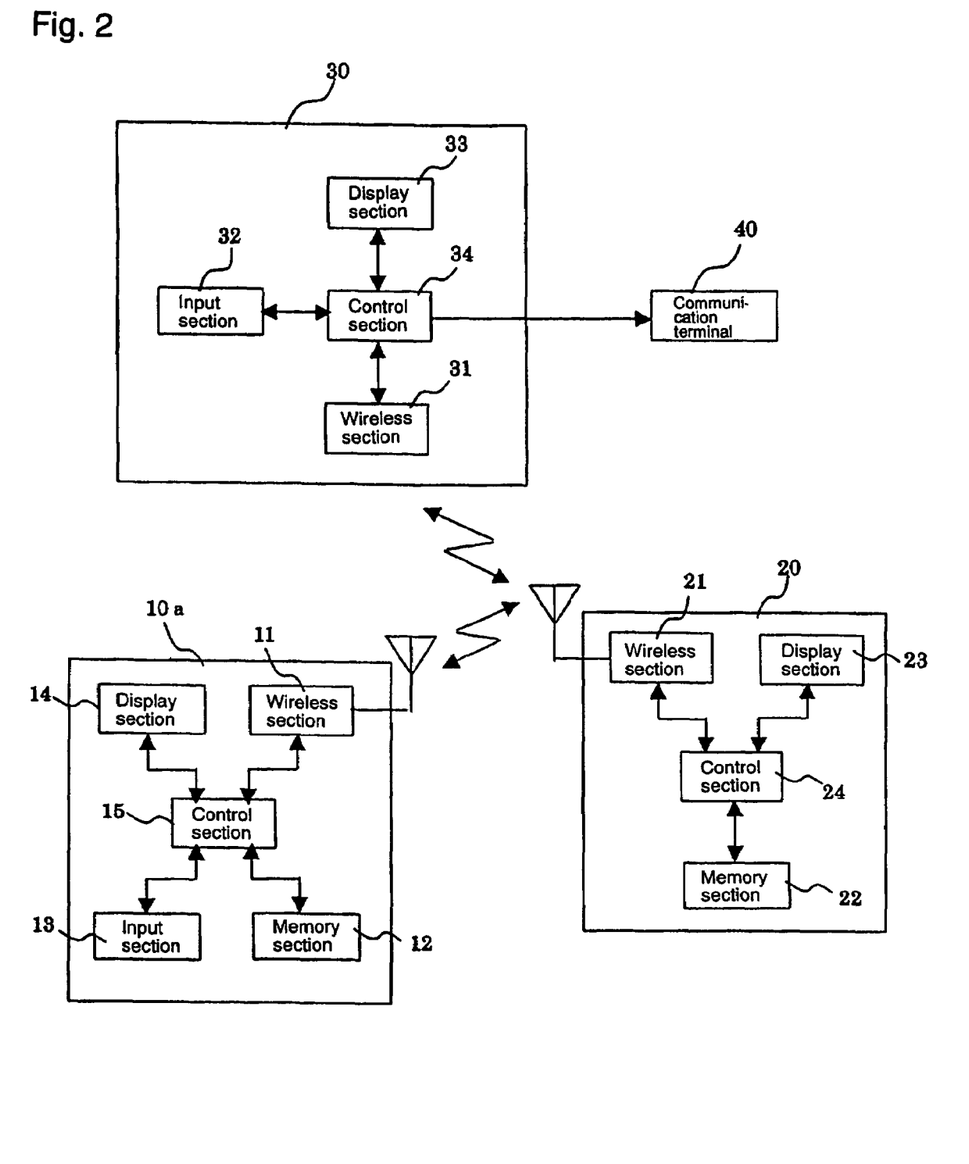
FIG. 2 is a block diagram illustrating the principal construction of the system for storing and managing personal information shown in FIG. 1.

FIG. 2 represents the principal construction of each of the mobile phone terminals, the wristwatch and the system device that constitute the system shown in FIG. 1. Since both mobile phone terminals 10a and 10b shown in FIG. 1 are of the same construction, only mobile phone terminal 10a is shown in the example in FIG. 2.

Referring to FIG. 2, the principal part of mobile phone terminal 10a comprises wireless section 11 for implementing the short-range wireless communication with wristwatch 20, memory section 12 for storing data y, which are a part of the personal information, input section 13 made up of an input button, a jog dial and the like, display section 14 having an LC (liquid crystal) display, and control section 15 adapted to control the operations of wireless section 11, memory section 12 and display section 14 in accordance with an input at input section 13.

The principal part of wristwatch 20 comprises, in addition to the functional structure of a clock, wireless section 21 for performing the short-range wireless communications with both mobile phone terminal 10a and system device 30; memory section 22 for storing data x, which are the only personal information of predetermined personal information items (data y); display section 23 provided with an LC display for displaying data x stored in memory section 22; and control section 24 for controlling the operations of wireless section 21, memory section 22 and display section 23. The display device for displaying time, provided as a clock, can be employed for display section 23.

The principal part of system device 30 comprises: wireless section 31 for performing short-range wireless communication with wristwatch 20; input section 32 provided with a keyboard; display section 33 provided with an LC display; and control section 34 for controlling the operations of wireless section 31 and display section 33 in accordance with an input at input section 32.

Explanation is presented about the operation of the system represented in FIG. 2 below.

(1) Establishment and Cancellation of Authentication

On those occasions when the user intends to employ wristwatch 20 as an external memory device, the establishment of authentication is conducted by mobile phone terminal 10a. When the establishment of authentication is intended, the user first performs an input operation at input section 13. This input operation causes control section 15 to read the program for executing the establishment of authentication, stored in advance in memory section 12, and to execute the program. Execution of the program involves a procedure by control section 15 that requires the user to input his/her PIN (personal identification number) through display section 14. Once the user inputs the PIN number, control section 15 operates to transmit the received PIN and also the ID number, assigned in advance to the mobile phone terminal to which control section 15 belongs, from wireless section 11 to wristwatch 20 as registered authentication information. The ID number is assigned when the communication carrier, who provides the mobile phone terminal, makes the utilization contract with the user.

In wristwatch 20, the registered authentication information (the PIN and ID numbers) that is transmitted from mobile phone terminal 10a is received by wireless section 21. Control section 24 operates to store the registered authentication information that is received in wireless section 21 into memory section 22. In the later steps, control section 24 decides access validity from mobile phone terminal 10a on the basis of the registered authentication information that is stored in memory section 22.

When canceling the establishment of the authentication, the user performs an input operation at input section 13 of mobile phone terminal 10a. In response to this input operation, control section 15 reads the program for canceling establishment of authentication, stored in advance in memory section 12, and executes the program. Execution of the program involves a procedure by control section 15 that requires the user to input his/her PIN number through display section 14. Upon the user inputs the PIN number at input section 13 in response to the requirement, control section 15 operates to transmit the received PIN and also the ID number assigned to the mobile phone terminal to which control section 15 belongs, from wireless section 11 to wristwatch 20 as registered authentication information. In wristwatch 20, control section 24 collates the information for authentication (the PIN and ID numbers) that is received at wireless section 21 with the registered authentication information stored in memory section 22.

If the collation results do not match, then control section 24 operates to send a notification from wireless section 21 to mobile phone terminal 10a that the authentication processing has not been normally completed. In mobile phone terminal 10a, when receiving notification that the authentication processing has not been normally completed, control section 15 operates to display a message on display section 14 describing the subject matter of the notification and ends the processing for canceling the establishment of authentication.

If the collation results match, then control section 24 operates to erase the registered authentication information stored in memory section 22 with regard to mobile phone terminal 10a, and also sends notification from wireless section 21 to mobile phone terminal 10a that the cancellation of the establishment of authentication has been normally completed. In mobile phone terminal 10a, when receiving notification that the cancellation of establishment of authentication has been normally completed, control section 15 operates to display a message on display section 14 describing the subject matter of the notification and ends the processing for canceling the establishment of authentication.

(2) Registration and Editing of Personal Information Into Wristwatch 20 by the User (2-a) Registration of Personal Information When the user inputs to manually register personal information into wristwatch 20, he or she first inputs the information at input section 13 of mobile phone terminal 10a. In response to this input operation, control section 15 reads the program for registering personal information stored in advance in memory section 12 and executes the program. Execution of the program involves a procedure by control section 15 to send the ID number of the mobile phone terminal, to which control section 15 belongs, to wristwatch 20 from wireless section 11. In wristwatch 20, when receiving the ID number at wireless section 21, control section 24 collates the received ID number with the registered authentication information (the ID number) stored in memory section 22.

If the collation results do not match, then control section 24 operates to send notification from wireless section 21 to mobile phone terminal 10a that the authentication processing has not been normally completed. In mobile phone terminal 10a, when receiving the notification that the authentication processing has not been normally completed, control section 15 operates to display a message on display section 14 describing the subject matter of the notification and ends the processing for registering the personal information.

If the collation results match, then control section 24 operates to send notification from wireless section 21 to mobile phone terminal 10a that the authentication processing has been normally completed. In mobile phone terminal 10a, when receiving the notification that the authentication processing has been normally completed, control section 15 operates to display, at display section 14, a message that wristwatch 20 is useable as an external memory device. In this way, mobile phone terminal 10a is placed in a state in which access to wristwatch 20 is feasible.

When the state in which access to wristwatch 20 is attained in mobile phone terminal 10a, control section 15 requires the user to input personal information to be registered through display section 14. When the user enters personal information at input section 13, in response to this requirement, control section 15 requires the user to confirm his or her intension to register the received personal information through display section 14. When the user provides an input that indicates the prosecution of the registration (the depression of an execution button) in response to the above requirement, control section 15 operates to transmit the personal information, supplied from the user, to wristwatch 20 through wireless section 11. In wristwatch 20, in response to receipt of the personal information at wireless section 21, control section 24 operates to store the received personal information into memory section 22 as data x. The registration of personal information into wristwatch 20, i.e., the registration of telephone-book data, is effected in this way.

(2-b) Editing Personal Information

In cases where the registered personal information is edited, the user performs an input operation to edit the personal information at input section 13 of mobile phone terminal 10a. Control section 15, in response to this input operation, reads a program for editing personal information stored in advance in memory section 12 and executes the program. The execution of the program involves a procedure by control section 15 to send the ID number of the mobile phone terminal, to which control section 15 belongs, to wristwatch 20 from wireless section 11. In wristwatch 20, when receiving the ID number at wireless section 21, control section 24 collates the received ID number with the registered authentication information (the ID number) that is stored in memory section 22.

If the collation results do not match, then control section 24 operates to send notification from wireless section 21 to mobile phone terminal 10a that the authentication processing has not been normally completed. In mobile phone terminal 10a, when receiving the notification that the authentication processing has not been normally completed, control section 15 operates to display a message describing the subject matter of the notification on display section 14 and ends the processing for editing the personal information.

If the collation results match, then control section 24 operates to send notification from wireless section 21 to mobile phone terminal 10a that the authentication processing has been normally completed. In mobile phone terminal 10a, when receiving the notification that the authentication processing has been normally completed, control section 15 operates to display a message that wristwatch 20 is useable as an external memory device. In this way, mobile phone terminal 10a is placed in a state in which access to wristwatch 20 is feasible (a state accessible to wristwatch 20).

On entering the state accessible to wristwatch 20, control section 15 in mobile phone terminal 10a requires that the user edit an input of personal information through display section 14. When the user inputs the personal information to be edited at input section 13 in response to this requirement, control section 15 requires the confirmation of the user's intention for editing the received personal information, to the user through display section 14. When the user provides an input to start the editing process (depressing an execution button) in accordance with the above confirmation, control section 15 transmits an instruction to wristwatch 20 through wireless section 11 for transmission of the content of the personal information supplied from the user. In wristwatch 20, in response to receipt of the instruction for transmission at wireless section 21, control section 24 operates to read the relevant personal information from memory section 22 and to send the read information to mobile phone terminal 10a from wireless section 21. In mobile phone terminal 10a, on receiving the relevant personal information, control section 15 operates to display the received relevant personal information on display section 14. The user checks the displayed content of the personal information and, if necessary, makes an input operation to alter the content at input section 13.

After the user alters the content of the personal information, control section 15 requests a confirmation from the user on acceptability of the altered content through display section 14. When the user depresses the execution button at input section 13 in accordance with the above confirmation, control section 15 operates to transmit the altered content supplied by the user from wireless section 11 to wristwatch 20. In wristwatch 20, on receiving the altered content at wireless section 21, control section 24 operates to modify the content of the personal information stored in memory section 22 based on the received altered content. Editing of registered personal information is effected in this way.

(3) Receiving and Sending Telephone Calls Through the Use of Mobile Phone Terminal 10a (3a) Receiving of Telephone Calls In mobile phone terminal 10a, when a call is received, control section 15 sends the ID number of the terminal, to which control section 15 belongs, to wristwatch 20 from wireless section 11, in order to execute the above authentication processing. The authentication processing is as described above.

When the state in which access to wristwatch 20 is attained in mobile phone terminal 10a after the authentication processing, control section 15 operates to acquire the necessary information, for example, the information on the caller, that is included in the personal information stored in memory section 22 of wristwatch 20 and to display the information on display section 14, whereby the user can obtain the information on the caller at the time of arrival of the call.

Further, concerning personal information displayed on display section 14, when the user makes an input operation to edit the content of the personal information at input section 13 and alters of the content of the personal information, control section 15 requests a confirmation on the acceptability of the altered content to the user through display section 14. When the user depresses the execution button at input section 13 in accordance with the above confirmation, control section 15 operates to transmit the altered content supplied by the user to wristwatch 20 from wireless section 11. In wristwatch 20, on receiving the altered content at wireless section 21, control section 24 operates to modify the content of the personal information stored in memory section 22 based on the received altered content. In this way, it becomes feasible to implement the processing that utilizes the telephone-book data at the time of the call's arrival.

(3-b) Making a Telephone Call

When the user makes an input operation for displaying the personal information at input section 13 of mobile phone terminal 10a in order to make a call request, control section 15 sends the ID number of the terminal, to which control section 15 belongs, to wristwatch 20 from wireless section 11, in order to execute the above authentication processing. The authentication processing is as described above.

When the state in which access to wristwatch 20 is attained in mobile phone terminal 10a after the authentication processing, control section 15 operates to acquire the information that the user requires, for example, information on the destination, from the personal information stored in memory section 22 of wristwatch section 20 and to display the acquired information on display section 14, whereby the user can make a telephone call based on the personal information displayed on display section 14. In this way, the processing at the time of making a telephone call can be effected through utilization of telephone-book data.

(4) Transmission and Receipt of E-mail Through the Use of Mobile Phone Terminal 10a (4-a) Receipt of E-mail When mobile phone terminal 10a receives e-mail, control section 15 operates to send the ID number of the terminal, to which control section 15 belongs, to wristwatch 20 from wireless section 11, in order to execute the above authentication processing. The authentication processing is as described above.

When the state in which access to wristwatch 20 is attained in mobile phone terminal 10a after authentication processing, control section 15 operates to acquire the information, relevant to the e-mail sender, from the personal information stored in memory section 22 of wristwatch section 20 and to display the acquired information on display section 14, whereby the user can obtain the information relevant to the mail sender at the time of receiving e-mail.

Further, concerning information of the mail sender displayed on display section 14, when the user makes an input operation to edit the content of the information at input section 13 and alter the content of the personal information, control section 15 requests a confirmation on the acceptability of the altered content from the user through display section 14. When the user depresses the execution button at input section 13 in accordance with the above confirmation, control section 15 operates to transmit the altered content, supplied by the user, to wristwatch 20 from wireless section 11. In wristwatch 20, on receiving the altered content at wireless section 21, control section 24 operates to modify the content of the information relevant to the mail sender stored in memory section 22 based on the received altered content. In this way, it becomes feasible to implement the processing that utilizes the telephone-book data at the time of receipt of e-mail.

(4-b) Transmission of E-mail

When the user makes an input operation for displaying personal information at input section 13 of mobile phone terminal 10a in order to send e-mail, control section 15 sends the ID number of the terminal, to which control section 15 belongs, to wristwatch 20 from wireless section 11, in order to execute the above authentication processing. The authentication processing is as described above.

When the state in which access to wristwatch 20 is attained in mobile phone terminal 10a after authentication processing, control section 15 operates to acquire the information that the user requires, for example, information on the destination, from the personal information stored in memory section 22 of wristwatch section 20 and to display the acquired information on display section 14, whereby the user can make an e-mail transmission operation based on the personal information displayed on display section 14. In this way, processing at the time of transmitting of e-mail can be effected through the utilization of telephone-book data.

(5) Making Telephone Calls Through the Use of Communication Terminal 40

The user goes to a nearby public telephone box, where the user makes a telephone call through the use of communication terminal 40. To make a telephone call request, the user first performs an input operation for displaying personal information at input section 32 of system device 30 that is arranged adjacent to communication terminal 40. In response to this input operation, control section 34 executes a program, stored in advance in a memory section (not shown), for reading out the personal information. Execution of the program involves a procedure by control section 34 to require the user to input a PIN number through display section 33. When the user inputs the PIN number in response to the requirement at input section 32, control section 34 operates to transmit the received PIN to wristwatch 20 from wireless section 31. In wristwatch 20, control section 24 collates the PIN received at wireless section 21 with the registered authentication information stored in memory section 22.

If the collation results do not match, then control section 24 operates to send notification from wireless section 21 to system device 30. In system device 30 that the authentication processing has not been normally completed, when receiving the notification that the authentication processing has not been normally completed, control section 34 operates to display a message on display section 33 describing the subject matter of the notification and ends the processing for reading out the personal information.

If the collation results match, then control section 24 operates to send notification from wireless section 21 to system device 30 that the authentication processing has been normally completed. In system device 30, when receiving the notification that the authentication processing has been normally completed, control section 34 operates to display on display section 33 a message that access to wristwatch 20 is feasible.

When the state in which access to wristwatch 20 is attained in system device 30, control section 34 operates to acquire from wristwatch section 20 the information that the user requires, for example, information on the destination, included in the personal information stored in memory section 22 and to display the acquired information on display section 33, whereby the user can make a call-request operation through communication terminal 40 at input section 32 with reference to the personal information displayed on display section 33. In this way, processing through use of communication terminal 40 at the time of a telephone request call can be effected through utilization of telephone-book data.

(6) Transmission and Receipt of E-mail Through the Use of Communication Terminal 40

When the user makes an input operation for transmitting/receiving e-mail at input section 32 of system device 30, control section 34 executes the program for e-mail stored in advance in a memory section (not shown). Execution of the program causes control section 34 that requires the user to input a PIN number through display section 33 in order to execute the authentication processing and also to operate to send the PIN, entered by the user in response to this requirement, from wireless section 31 to wristwatch 20. Since the authentication processing is as explained in the above section "(5) Making telephone calls through use of a communication terminal 40", the explanation thereof is herein omitted.

The state in which access to wristwatch 20 is attained after the authentication processing. In system device 30, control section 34 operates to acquire from wristwatch section 20 information required by the user in the personal information that is stored in memory section 22, for example, information on destination of e-mail, and to display the acquired information on display section 33, whereby the user can effect a transmission operation of the mail through communication terminal 40 at input section 32 with reference to the personal information displayed on display section 33. In addition, on receiving e-mail, control section 34 operates to acquire the information on the transmitter from wristwatch 20 and also to display the acquired information on display section 33. In this way, the user can obtain information on the transmitter relevant to e-mail that is received through communication terminal 40, whereby processing at the time of transmission and receipt of e-mail through the utilization of communication terminal 40 is effected by making use of the telephone-book data.

Furthermore, in order to transmit and receive e-mail through the utilization of communication terminal 40, it is necessary for the user to install in advance in system device 30 information necessary for the transmission and receipt of e-mail (mail addresses, name of the mail server and the like given in advance). Still further, it is feasible to employ an existing procedure for settling accounts as a means to levy a utilization charge for communication terminal 40 (a charge for communication), for example, the settlement of accounts through the use of a credit card, which the user carries with him or her, or the settlement of accounts through the use of a medium such as an IC card that allows account transaction, or the like.

(7) Display of Personal Information in Stand-Alone Wristwatch 20

When the user makes an input operation for displaying personal information at input section (not shown) of wristwatch 20, control section 24 executes the program for displaying the personal information stored in memory section 22. Execution of the program involves the procedure by control section 24 to require the user to input a PIN number through display section 23. When the user inputs the PIN number in response to the requirement at the input section, control section 24 collates the received PIN with the registered authentication information (the PIN) stored in memory section 22.

If the collation results do not match, then control section 24 operates to display a message that the authentication processing has not been normally completed at display section 23 and ends the process to display personal information. If the collation results match, then control section 24 operates to display a message that the authentication processing has been normally completed at display section 23 and also to display the personal information that is stored in memory section 22.

In the above-described system for storing and managing personal information of the present embodiment, personal information such as telephone-book data (data x) is not stored in a mobile phone terminal but is stored in wristwatch 20. Thus, it is possible to reduce the storage capacity of the mobile phone terminal by the amount that would be required to store data x.

In addition, since personal information (data x) is not stored in the mobile phone terminal, use of the personal information for illegitimate or unauthorized purposes can be obviated even if the user has lost the mobile phone terminal or has left it behind.

Also in cases where the user has left his or her mobile phone terminal at home, the user can effect a telephone call request, transmission and receipt of e-mail by accessing to personal information (data x), for example, at system device 30, provided that the user carries wristwatch 20.

Furthermore, since it is feasible to display the personal information (data x) on wristwatch 20 itself, the user can obtain the necessary information from the displayed personal information.

In cases where, due to failure of the mobile phone terminal, an alternative device is provided, the user can obtain the personal information from wristwatch 20 by using the alternative device. In this case, the user first effects an establishment of authentication on wristwatch 20. The procedures of the establishment of authentication are as in the above-described paragraph "(1) establishment and cancellation of authentication." By establishment of authentication, access of the alternative device to wristwatch 20 becomes feasible, whereby the user can send and receive telephone calls and also transmission and receipt of e-mail through utilization of the personal information stored in wristwatch 20 by using an alternative device as well. In the same way, the user, when he or she has no mobile phone terminal at hand, can make a call request by utilizing the personal information stored in wristwatch 20 as is, through the use of a mobile phone terminal borrowed from an acquaintance. Also, in cases where the mobile phone terminal is renewed due to contract renewal or renewal of the device model or the like, it is feasible to utilize the personal information stored in wristwatch 20 as is, through the use of the renewed mobile phone terminal.

In mobile phone terminal 10b is used as a PC that is provided with a capability both for short-range wireless communication with wristwatch 20 and for connecting with the internet, the user can make a telephone call request by mobile phone terminal 10a with reference to the personal information stored in wristwatch 20 and also can transmit and receive e-mail at the same time based on the personal information stored in wristwatch 20 by making use of the PC.

The hereinabove described system for storing and managing personal information of the present embodiment is an example and the construction can properly be modified within a general range without departing from the spirit of the present invention. For example, while the above embodiment employs a wristwatch as an external memory device, the memory device can be a commodity that the user daily carries, such as a key-holder, a music player, a radio, a writing utensil, a credit card, a commuter ticket or a purse, in place of wristwatch 20.

Furthermore, while the explanation has used a mobile phone terminal as an example, other portable communication terminal such as a PDA or a PC may be used in place of the mobile phone terminal.

Further, while a PIN number is used as authentication information, any of a variety of other information items may be used such as a pass word or the like.

Additionally, wristwatch 20 is as item purchased by a user the storage capacity of which can be determined depending on the amount of data required by the user.

The sections, mobile phone terminals 10a and 10b, wristwatch 20 and system device 30, are adapted to perform the respective operations basically through execution of a program by a computer, the operations being: "(1) Establishment and cancellation of authentication"; "(2) Registration and editing of personal information into wristwatch 20 by the user"; "(3) Receiving and sending telephone calls through the use of mobile phone terminal 10a"; "(4) Transmission and receipt of e-mail through the use of mobile phone terminal 10a"; "(5) Making telephone calls through the use of communication terminal 40"; "(6) Transmission and receipt of e-mail through the use of communication terminal 40"; and "(7) Display of personal information in stand-alone wristwatch 20."

As described above, the present invention allows a mobile phone terminal borrowed from an acquaintance, an alternative device, a mobile phone terminal newly purchased due to a new contract, a change in the device model or the like, and a PC, to utilize the personal information (the telephone-book data and the like) stored in a portable external memory system as is without any transfer of the data, thereby improving user-friendliness.

Furthermore, since it suffices for the user to buy a mobile phone terminal that has a small storage capacity regardless of the amount of telephone-book data to be used, the cost burden to the user can be alleviated.

In addition, since the mobile phone terminal stores no personal information, this information is protected from being used for illegitimate or unauthorized purposes even when the user has lost the mobile phone terminal or left it behind.

Further, since it is feasible for the user to make a phone call while using the terminal as a PC to send/receive e-mail, user friendliness of the present invention is further improved.

While preferred embodiments of the present invention have been described using specific terms, such description is for illustrative purposes only, and it is to be understood that changes and variations may be made without departing from the spirit or scope of the following claims.

What is claimed is:

1. A system for storing and managing personal information, comprising:
    at least one mobile communication terminal communicating with another mobile communication terminal; and
    a portable external memory system adapted to make mutual communication with said mobile communication terminal through short-range wireless communication,
    wherein said portable external memory system comprises:
        a first memory section that stores user's personal information and registered authentication information for deciding validity of said mobile communication terminal; and
        a first control section that permits access to said personal information stored in said first memory section to said mobile communication terminal only when the information for authentication that is received from said mobile communication terminal matches with said registered authentication information stored in said first memory section, and
    wherein said mobile communication terminal contacts said another mobile communication terminal using said accessed personal information.

2. A system for storing and managing personal information according to claim 1, wherein said portable external memory system further comprises a first input section and a first display section, said first control section operating to read said personal information from said first memory section and to display the read personal information on said first display section only when the information for authentication that is received at said first input section matches with said registered authentication information stored in said first memory section.

3. A system for storing and managing personal information according to claim 1, wherein said mobile communication terminal comprises:
    a second input section;
    a second display section;
    a second memory section that stores in advance said information for authentication; and a second control section that operates to transmit the information for authentication stored in said second memory section to said portable external memory system when an input intended for a predetermined operation is made at said second input section, and when the transmission of said information for authentication yields permission of access to said first memory section, operates to acquire the personal information necessary for effecting said predetermined operation from the personal information stored in said first memory section and to display the acquired personal information on said second display section.

4. A system for storing and managing personal information according to claim 3, wherein said predetermined operation is an operation for a telephone call request.

5. A system for storing and managing personal information according to claim 3, wherein said predetermined operation is an operation for transmission of electronic mail.

6. A system for storing and managing personal information according to claim 3, wherein when said second control section receives a communication from an external source, said second control section operates to transmit the information for authentication stored in said second memory section to said portable external memory system, and if access to said first memory section is permitted on the basis of the transmitted information for authentication, then the second control section operates to acquire the personal information necessary for receiving the communication from the personal information stored in said first memory section and to display the acquired personal information on said second display section.

7. A system for storing and managing personal information according to claim 6, wherein said communication from said external source is a received telephone call, and said personal information necessary for receiving the communication is the personal information regarding the telephone caller.

8. A system for storing and managing personal information according to claim 6, wherein said communication from said external source is the receipt of electronic mail, and said personal information necessary for receiving the communication is the personal information regarding the transmitter of the electronic mail.

9. A system for storing and managing personal information according to claim 1, wherein said system comprises a plurality of said mobile communication terminals,
said first control section permits access to the personal information stored in said first memory section for at least two mobile communication terminals at once that have transmitted the items of information for authentication which match the contents of the registered authentication information.

10. A system for storing and managing personal information according to claim 1, further provided with a system device capable of making mutual communication with said portable external memory system through a short-range wireless communication, said system device comprising:
a third input section; and
a third control section capable of operating to transmit the information for authentication received at said third input section to said portable external memory system, wherein
said first control section permits said system device access to the personal information stored in said first memory section, only if the information for authentication received from said system device matches with said registered authentication information stored in said first memory system.

11. A system for storing and managing personal information according to claim 10, further provided with a communication terminal connected to said system device through wired or wireless communication as well as a predetermined communication network,
said system device further comprises a third display section, wherein said third control section operates to acquire the information required for communication through said communication terminal from said portable external memory system and to display the acquired information on said third display section.

12. A system for storing and managing personal information according to claim 11, wherein said communication through said communication terminal is a telephone call request and said information required for communication is the destination information required for the call request.

13. A system for storing and managing personal information according to claim 11, wherein said communication through said communication terminal is transmission of electronic mail and said information required for communication is the destination information required for the transmission of the electronic mail.

14. A system for storing and managing personal information according to claim 1, wherein said portable external memory system includes a wristwatch.

15. A portable external memory system adapted to make mutual communication with at least one mobile communication terminal through short-range wireless communication, comprising:
a memory section that stores user's personal information and registered authentication information for deciding validity of said mobile communication terminal; and
a control section that permits said mobile communication terminal to access said user's personal information stored in said memory section only when the information for authentication received from said mobile communication terminal matches the registered authentication information stored in said memory section,
wherein said mobile communication terminal contacts another mobile communication terminal using said user's personal information.

16. A portable external memory system according to claim 15, further provided with an input section and a display section, said control section operating to read out said personal information from said memory section and to display the read personal information on said display section only when information for authentication that is obtained by an input operation at said input section matches said registered authentication information stored in said memory section.

17. A method of storing and managing personal information implemented in a system in which at least one mobile communication terminal and a portable external memory system are connected to allow mutual communication through short-range wireless communication, comprising:
transmitting, to said portable external memory system, authentication information for deciding validity of said mobile communication terminal and user's personal information, by said mobile communication terminal;
storing the user's personal information and registered authentication information received from said mobile communication terminal in a first memory section of said portable external memory system, by said portable external memory system;

transmitting, to said portable external memory system, the information for authentication for access to said personal information stored in said first memory section, by said mobile communication terminal;

permitting said mobile communication terminal to access said personal information stored in said first memory section only when the information for authentication received from said mobile communication terminal matches said registered authentication information stored in said first memory section, by said portable external memory system; and contacting another mobile communication terminal by said mobile communication terminal using said user's personal information.

18. A method of storing and managing personal information according to claim 17, wherein said portable external memory system is provided with an input section and a display section, said method of storing and managing personal information further comprising the step of:

only when the information for authentication received at said input section matches said registered authentication information stored in said first memory section, reading said personal information from said first memory section and displaying the read personal information on said display section, by said portable external memory system.

19. A method of storing and managing personal information according to claim 17, wherein said mobile communication terminal comprises a second memory section that stores in advance said information for authentication, an input section and a display section, and said method of storing and managing personal information further comprises the steps of:

said mobile communication terminal transmitting the information for authentication stored in said second memory section to said portable external memory system when an input intended for a predetermined operation is made at said input section;

when the transmission of said information for authentication yields permission of access to said first memory section, said mobile communication terminal acquiring the personal information necessary for effecting said predetermined operation from the personal information stored in said first memory section; and said mobile communication terminal displaying the acquired personal information on said display section.

20. A method of storing and managing personal information according to claim 19, wherein said predetermined operation is an operation for a call request.

21. A method of storing and managing personal information according to claim 19, wherein said predetermined operation is an operation for transmission of electronic mail.

22. A method of storing and managing personal information according to claim 19, further comprising the steps of:

said mobile communication terminal transmitting the information for authentication stored in said second memory section to said portable external memory system when said mobile communication terminal receives a communication from an external source;

said mobile communication terminal acquiring the personal information necessary for receiving communication from the personal information stored in said first memory section and if the access to said first memory section is permitted on the basis of the transmitted information for authentication; and said mobile communication terminal displaying the acquired personal information on said display section.

23. A method of storing and managing personal information according to claim 22, wherein said communication from said external source is a received telephone call and said personal information necessary for receiving the arrival communication is the personal information regarding the telephone caller.

24. A method of storing and managing personal information according to claim 22, wherein said communication from said external source is the receipt of electronic mail and said personal information necessary for receiving the arrival communication is the personal information regarding the transmitter of electronic mail.

25. A method of storing and managing personal information according to claim 17, further comprising the step of:

said portable external memory system permitting access to the personal information stored in said first memory section for at least two mobile communication terminals at once that store items of the information for authentication which matches the contents of the registered authentication information.

26. A method of storing and managing personal information according to claim 17, further comprising the steps of:

a system device, capable of effecting mutual communication with said portable external memory system through short-range wireless communication, transmitting the information for authentication received at the input section of said system device to said portable external memory system, and said portable external memory system permitting said system device to access the personal information stored in said first memory section only when the information for authentication received from said system device matches said registered authentication information stored in said first memory system.

27. A method of storing and managing personal information according to claim 26, further comprising the steps of:

said system device, provided with a third display section, acquiring the information required for communication through the communication terminal connected to a predetermined network, from said portable external memory system, and displaying the acquired information on said third display section.

28. A method of storing and managing personal information according to claim 27, wherein said communication through said communication terminal is a telephone call request and said information required for the communication is the destination information required for the call request.

29. A method of storing and managing personal information according to claim 27, wherein said communication through said communication terminal is transmission of electronic mail and said information required for communication is the destination information required for the transmission of the electronic mail.

30. A program stored on a computer-readable medium, said program is for storing and managing personal information intended to be executed in a system for storing and managing personal information, in which at least one mobile communication terminal and a portable external memory system are coupled to allow mutual communication through short-range wireless communication, comprising:

directing the computer of said mobile communication terminal to execute a process of transmitting user's personal information and registered authentication information for deciding validity of the mobile communication terminal, to said portable external memory system, directing the computer of said portable external memory system to execute a process of storing said user's personal information and said registered authentication information received from said mobile communication terminal, in a first memory section of the portable external memory system, directing the computer of said mobile communication terminal to execute a process of transmitting the information for authentication required for access to said personal information stored in said first memory section, to said portable external memory system, and directing the computer of said portable external memory system to execute a process of permitting said mobile communication terminal to access said personal information stored in said first memory section only when the information for authentication received from said mobile communication terminal matches the registered authentication information stored in said first memory section, wherein said mobile communication terminal contacts another mobile communication terminal using said user's personal information.

31. A portable external memory device comprising:

a communication section adapted to communicate with at least one mobile communication terminal via short-range wireless communication;

a first memory section adapted to store user's personal information and registered authentication information for deciding validity of said mobile communication terminal; and a first control section adapted to permit access to said personal information stored in said first memory section to said mobile communication terminal when the information for authentication, received from said mobile communication terminal, matches with said registered authentication information stored in said first memory section, wherein said mobile communication terminal contacts another mobile communication terminal using said user's personal information.

32. The portable external memory device according to claim 31, wherein the portable external memory device is one of a wristwatch, a key-holder, a music player, a radio, a writing utensil, a credit card, a commuter ticket, and a purse.

33. The portable external memory device according to claim 31, wherein the first memory section stores said user's personal information comprising data stored in a telephone book, wherein said data comprises names, telephone numbers, and email addresses.

34. The method of storing and managing personal information according to claim 17 further comprising displaying on said mobile communication terminal the accessed personal information.

35. The system according to claim 1, wherein the portable external memory system does not display the user's personal information and the registered authentication information.

36. The system according to claim 35, wherein only the at least one mobile terminal displays the user's personal information and the registered authentication information after access is permitted.

* * * * *